US006815601B2

(12) United States Patent
Yano

(10) Patent No.: US 6,815,601 B2
(45) Date of Patent: Nov. 9, 2004

(54) METHOD AND SYSTEM FOR DELIVERING MUSIC

(75) Inventor: Masatoshi Yano, Tokyo (JP)

(73) Assignee: NEC Corporation (JP)

( * ) Notice: Subject to any disclaimer, the term of this patent is extended or adjusted under 35 U.S.C. 154(b) by 360 days.

(21) Appl. No.: 10/001,520

(22) Filed: Oct. 26, 2001

(65) Prior Publication Data

US 2002/0050207 A1 May 2, 2002

(30) Foreign Application Priority Data

Oct. 30, 2000 (JP) ....................................... 2000-331183

(51) Int. Cl.[7] .............................. G10H 5/00; H04J 3/00
(52) U.S. Cl. ........................................... 84/655; 84/660
(58) Field of Search .......................... 84/603, 617, 618, 84/655, 656, 660

(56) References Cited

U.S. PATENT DOCUMENTS 5,518,408 A 5/1996 Kawashima et al.
5,974,387 A 10/1999 Kageyama et al.

FOREIGN PATENT DOCUMENTS

WO WO 02/05433 A 1/2002

OTHER PUBLICATIONS

European Search Report dated Jun. 13, 2002.

*Primary Examiner*—Jeffrey W Donels
(74) *Attorney, Agent, or Firm*—Dickstein, Shapiro, Morin & Oshinsky, LLP.

(57) ABSTRACT

A system for delivering music is provided, which reduces further the data amount of music to be delivered. A music delivery subsystem, which generates a delivering data from an original music data including a voice data and a performance data, comprises a compression coder and a multiplexer. The coder compression-codes the voice data of the original music data, thereby generating a compression-coded voice data. The multiplexer multiplexes the compression-coded voice data and the performance data, thereby generating a delivering data. At least one music reproduction subsystem, which reproduces an original music corresponding to the original music data from the delivering data transmitted through a computer or communications network, comprises a demultiplexer, a performance data configurer, a voice data decoder, and a mixer. The demultiplexer demultiplexes the delivering data to the compression-coded voice data and the performance data. The performance data configurer configures a musical performance from the performance data, thereby forming a performance configuration. The voice data decoder decodes the compression-coded voice data to generate a voice data. The mixer mixes the performance configuration from the performance data configurer and the voice data from the voice data decoder, thereby generating a mixed data corresponding to the original music.

11 Claims, 12 Drawing Sheets

METHOD AND SYSTEM FOR DELIVERING MUSIC

BACKGROUND OF THE INVENTION

1. Field of the Invention

The present Invention relates to a music delivery method and a music delivery system. More particularly, the invention relates to a method and a system for delivering music by way of computer or communications networks, which are preferably applied to delivery of a music data including voice data and performance data.

2. Description of the Related Art

Generally, music may be classified into "vocal music" including vocals (i.e., the sound of a voice or voices) and accompaniment (i.e., the sound of a musical instrument or instruments in the background) and "instrumental music" including only the sound of a musical instrument or instruments. Conventionally, almost all pieces of music to be delivered to specific receivers by way of computer or communications networks are vocal music. If piece music are delivered as they are, they require a wide communication band during transmission and a large amount of storage medium in storing or recording. Therefore, to decrease the data amount to be transmitted, it is usual that digital music data corresponding to a piece or pieces of music are subjected to irreversible data compression utilizing the human psycoacoustic sense, such as the MPEG (Moving Picture Experts Group) Audio, ATRAC (Adaptive Transform Acoustic Coding), or the like, prior to delivery. After being delivered, they are expanded for reproduction of the piece or pieces of music on the receiver side.

With prior-art methods and systems for music delivery using one of the known irreversible data compression techniques, there is a problem that the possible highest compression rate for digital data of an original music is restricted to approximately one-tenth (1/10) or less with respect to the original data amount. This is because if the compression rate is further increased, the sound quality of a reproduced original music degrades excessively.

SUMMARY OF THE INVENTION

Accordingly, an object of the present invention is to provide a method and system for delivering music by way of computer. or communications network that reduce further the data amount of music to be delivered compared with the above-identified prior-art methods and system while preventing or effectively suppressing degradation of the sound quality of reproduced music.

Another object of the present invention is to provide a method and system for delivering music by way of computer or communications network that enhances the irreversible data compression rate while preventing or effectively suppressing degradation of the sound quality of reproduced music.

The above objects together with others not specifically mentioned will become clear to those skilled in the art from the following description.

According to a first aspect or the invention, a system for delivering music is provided, which comprises:

(a) a music delivery subsystem for generating a delivering data from an original music data including a voice data and a performance data;

the music delivery subsystem comprising a compression coder and a multiplexer;

the compression coder compression coding the voice data or the original music data, thereby generating a compression-coded voice data;

the multiplexer multiplexing the compression-coded voice data from the compression coder and the performance data of the original music data, thereby generating a delivering data;

(b) a network for allowing the delivering data to be transmitted; and (c) at least one music reproduction subsystem for reproducing an original music corresponding to the original music data from the delivering data transmitted through the network;

the at least one music reproduction subsystem comprising a demultiplexer, performance data configurer, a voice data decoder, and a mixer;

the demultiplexer demutiplexing the delivering data to the compression-coded voice data and the performance data;

the performance data configurer configuring a musical performance from the performance data, thereby forming a performance configuration;

the voice data decoder decoding the compression-coded voice data to generate a voice data;

the mixer mixing the performance configuration from the performance data configurer and the voice data frog the voice data decoder, thereby generating a mixed data corresponding to the original music.

With the system for delivering music according to the first aspect of the invention, in the music delivery subsystem, the compression coder makes its compression-coding operation to the voice date of the original music data, thereby generating the compression-coded voice data. The multiplexer multiplexes the compression-coded voice data from the compression coder and the performance data of the original music data, thereby generating the delivering data. The delivering data thus generated is then transmitted through the network.

Thus, the delivering data is generated by multiplexing the compression-coded voice data of the original music data and the performance data thereof. Therefore, the amount of the compression-coded voice data is reduced due to its narrowness of the communication bandwidth and at the same time, the amount of the compression coded voice data will be null or zero in the introduction and episode parts of the original music. As a result, the data amount of music to be delivered is further reduced compared with the above-identified prior-art methods and systems. This means that the irreversible data compression rate is enhanced.

On the other hand, in the at least one music reproduction subsystem, the demultiplexer demultiplexes the delivering data thus transmitted by way of the network to the compression-coded voice data and the performance data. The performance data configurer forms the performance configuration from the performance data thus demultiplexed. The voice data decoder forms the voice data from the compression-coded voice data thus demultiplexed. Then, the mixer mixes the performance configuration and the voice data, thereby generating the mixed data corresponding to the original music.

Thus, the musical performance of the original music is reproduced according to the performance data transmitted from the music delivery subsystem in the at least one music reproduction subsystem. Data compression is unnecessary for the performance data. As a result, the sound quality degradation of the reproduced music is prevented or effectively suppressed.

In a preferred embodiment of the system for delivering music according to the first aspect, the multiplexer of the music delivery subsystem adds time stamp data to the voice data and the performance data. The music reproduction subsystem comprises a synchronizer for synchronizing the voice of the original music and the musical performance thereof with each other through comparison between the time stamp data of the voice data and that of the performance data.

In another preferred embodiment of the system for delivering music according to the first aspect, the compression coder of the music delivery subsystem is designed not to generate the voice data while the original music includes no voice.

In still another preferred embodiment of the system for delivering music according to the first aspect, the voice data is generated to form a monophonic or monaural voice and includes an utterance point data (e.g., the stereophonic position data and the depth data of hte utterance point). The voice data decoder of the music reproduction subsystem decodes the compression-coded voice data to generate the voice data using the utterance point data.

According to a second aspect of the invention, a music delivery subsystem is provided, which comprises:

(a) a compression coder for compression-coding a voice data of an original music data to thereby generate a compression-coded voice data; and (b) a multiplexer for multiplexing the compression-coded voice data from the compression coder and a performance data of the original music data, thereby generating a delivering data.

With the music delivery subsystem according to the second aspect, a music delivery subsystem suitable to the system according to the first aspect is provided.

In a preferred embodiment of the music delivery subsystem according to the second aspect, the multiplexer adds time stamp data to the voice data and the performance data. The time stamp data of the voice data and that of the performance data are used for synchronization between the voice data and the performance data.

In another preferred embodiment of the music delivery subsystem according to the second aspect, the compression coder is designed not to generate the voice data while the original music includes no voice.

In still another preferred embodiment of the music delivery subsystem according to the second aspect, the voice data is generated to form a monophonic or monaural voice and includes an utterance point data (e.g., the stereophonic position data and the depth data of the utterance point).

According to a third aspect of the invention, a music reproduction subsystem for reproducing an original music from a delivering data including a compression-coded voice data and a performance data multiplexed together is provided, which comprises:

(a) a demultiplexer for demultiplexing the delivering data to the compressing-coded voice data and the performance data;

(b) a performance data configurer for configuring a musical performance from the performance data, thereby forming a performance configuration;

(c) a voice data decoder for decoding the compression-coded voice data to generate a voice data; and (d) a mixer for mixing the performance configuration from he performance data configurer and the voice data from the voice data decoder, thereby generating a mixed data corresponding to the original music.

With the music reproduction subsystem according to the third aspect of the invention, a music reproduction subsystem suitable to the system according to the first aspect is provided.

In a preferred embodiment of the music reproduction subsystem according to the third aspect, a synchronizer is further provided for synchronization between the voice data and the performance configuration through comparison between a time stamp data of the voice data and a time stamp data of the performance data.

In another preferred embodiment of the music reproduction subsystem according to the third aspect, the voice data is generated to form a monophonic or monaural voice and includes an utterance point data (e.g., the stereophonic position data and the depth data of the utterance point).

According to a fourth aspect of the invention, a method for delivering music is provided, which comprises the steps of:

(a) compression coding a voice data of an original music data, thereby generating a compression-coded voice data;

(b) multiplexing the compression-coded voice data from the compression coder and a performance of the original music data, thereby generating a delivering data;

(c) delivering the delivering data to at least one music reproduction subsystem by way of a network;

(d) demultiplexing the delivering data to the compression-coded voice data and the performance data in the at least one music reproduction subsystem;

(e) configuring a musical performance from the performance data, thereby forming a performance configuration data in the at least one music reproduction subsystem;

(f) decoding the compression coded voice data to generate a voice data in the at least one music reproduction subsystem;

(g) mixing the performance configuration data formed in the step (e) and the voice data generated in the step (f), thereby generating a mixed data corresponding to the original music data in the at least one music reproduction subsystem.

With the method for delivering music according to the fourth aspect of the invention, the voice data of the original music data is compression-coded, thereby generating the compression-coded voice data in the step (a). The compression-coded voice data from the compression coder and the performance data of the original music data are multiplexed, thereby generating the delivering data in the step (b). The delivering data is delivered to the at least one music reproduction subsystem by way of the network in the step (c).

In the step (d), the delivering data is demultiplexed to the compression-coded voice data and the performance data in the at least one music reproduction subsystem. Then, the musical performance is configured from the performance data, thereby forming the performance configuration in the at least one music reproduction subsystem in the step (e). The compression-coded voice data is decoded to generate the voice data in the at least one music reproduction subsystem in the step (f). The performance configuration formed in the step (c) and the voice data generated in the step (f) are mixed, thereby generating the mixed data corresponding to the original music data in the at least one music reproduction subsystem in the step (g).

Accordingly, the amount of the compression-coded voice data is reduced due to its narrowness of the communication bandwidth and at the same time, the amount of the compression-coded voice data will be null or zero in the introduction and episode parts of the original music. As a result, the data amount of music to be delivered is further reduced compared with the above-identified prior-art methods and systems. This means that the irreversible data compression rate is enhanced.

Moreover, the musical performance of the original music is reproduced according to the performance data transmitted through the network in the at least one music reproduction subsystem. Data compression is unnecessary for the performance data. As a result, the sound quality degradation of the reproduced music is prevented or effectively suppressed.

In a preferred embodiment of the method for delivering music according to the fourth aspect, time stamp data are added to the voice data and the performance data. The voice of the original music and the musical performance thereof are synchronized with each other through comparison between the time stamp data of the voice data and that of the performance data.

In another preferred embodiment of the method for delivering music according to the fourth aspect, the voice data is not generated while the original music includes no voice.

In still another preferred embodiment of the method for delivering music according to the fourth aspect, the voice data is generated to form a monophonic or monaural voice and includes an utterance point data (e.g., the stereophonic position data and the depth data of the utterance point). The compression-coded voice data is decoded to generate the voice data using the utterance point data in the step (f).

BRIEF DESCRIPTION OF THE DRAWINGS

In order that the present invention may be readily carried into effect, it will now be described with reference to the accompanying drawings.

FIGS. 2A and 2B are functional block diagrams showing the configuration of the music delivery subsystem used in the music delivery system according to the first embodiment of FIG. 1, in which FIG. 2B shows the separation process of the voice data from the performance data in the original music data and FIG. 2A shows the subsequent processes of the voice and performance data thus separated.

DETAILED DESCRIPTION OF THE PREFERRED EMBODIMENTS

Figure 1:
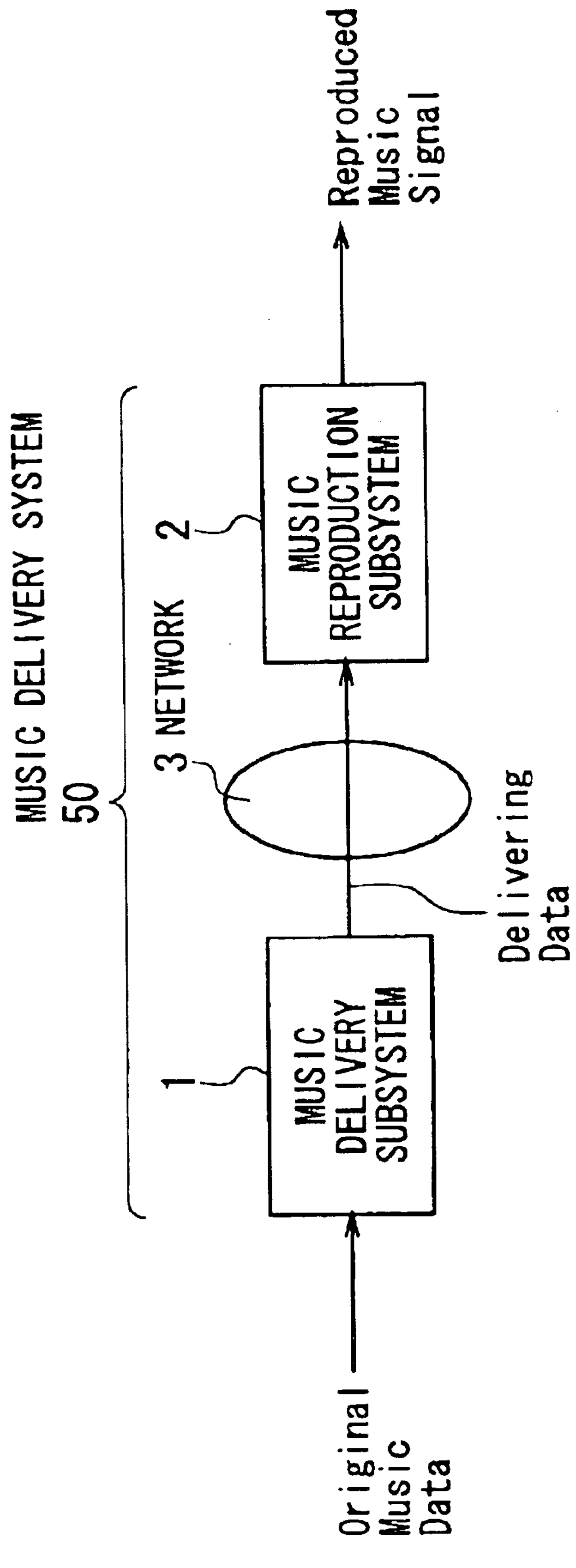
FIG. 1 is a functional block diagram showing the configuration of a music delivery system according to a first embodiment of the invention.

Preferred embodiments of the present invention will be described in detail below while referring to the drawings attached.

First Embodiment

As shown in FIG. 1, a music delivery system 50 according to a first embodiment of the invention comprises a music delivery subsystem 1, a music reproduction subsystem 2, and a computer or communications network 3. The subsystem 2 is usually provided in a terminal (e.g., a personal computer) of a specific receiver. However, it is needless to say that the subsystem 2 may be configured for a specific user as a dedicated device. Although the system 50 comprises a lot of music reproduction subsystems 2 along with the subsystem 1 in reality, only one of the subsystems 2 is shown and explained here for the sake of simplification of description.

The music delivery subsystem 1 receives a "digital original music data" of a piece of music and then, outputs a "digital delivering data" through specific data processing. The digital delivering data is transmitted to the music reproduction subsystem 2 through the network 3, such as the Internet, LANs (Local Area Networks), and WANs (Wide Area Networks).

The music reproduction subsystem 2 receives thee digital delivering data transmitted by the subsystem 1. Then, the subsystem 2 outputs an "analog reproduced music signal" through specific data processing. The reproduced music data is used to reproduce the sound of the piece of music thus delivered with a speaker (not shown) or the like.

Figure 2A:
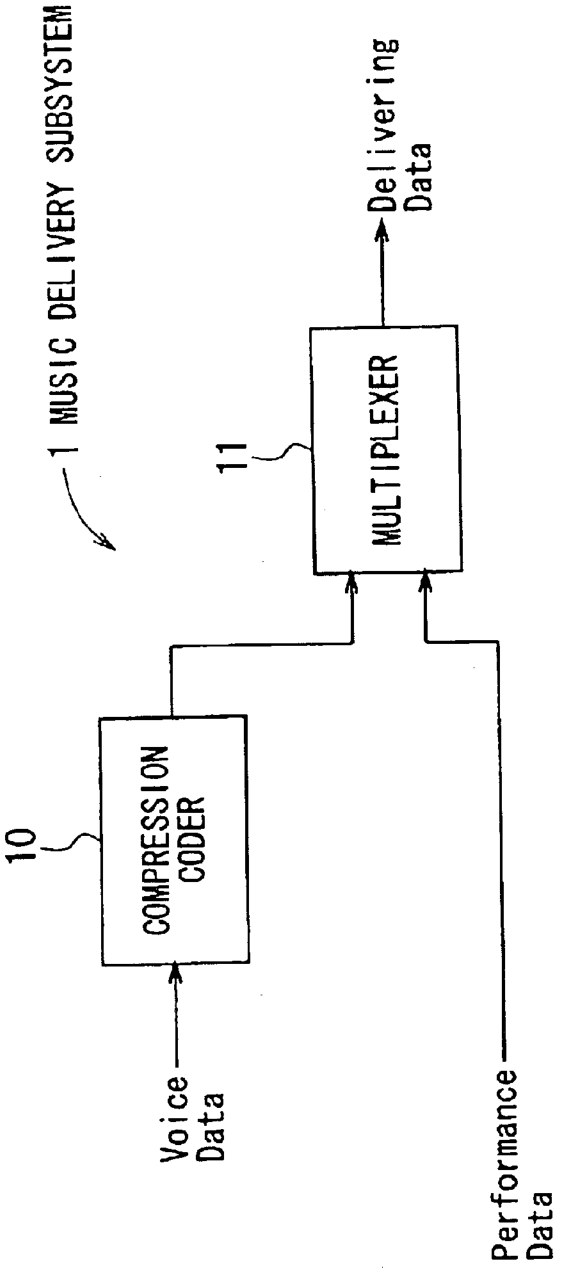
Figure 2B:
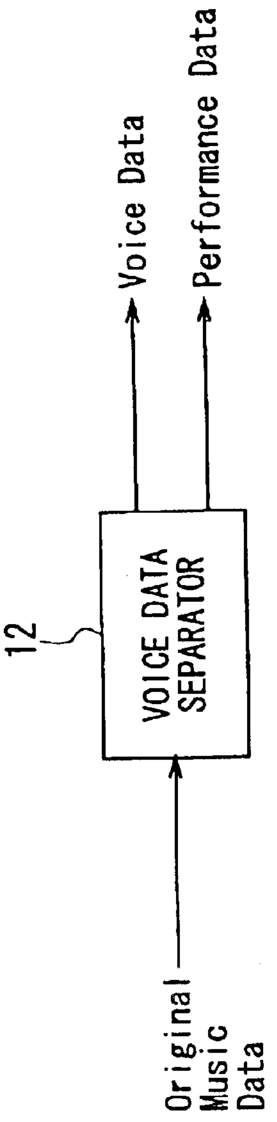

The music delivery subsystem 1 has the configuration as shown in FIGS. 2A and 2B. Specifically, the subsystem 1 comprises a compression coder 10, a multiplexer 11, and a voice data separator 12.

The voice data separator 12 receives the digital original music data of a piece of music to be delivered and then, separates the voice data from the performance data in the original music data. If the voice data and the performance data are separately formed in advance, the separator 12 is unnecessary.

The compression coder 10 receives the voice data of the original music data and then, conducts its compression-coding operation to the voice data thus received. Then, the coder 10 outputs the compression-coded voice data to the multiplexer 11. From the viewpoint of the obtainable compression rate, irreversible compression coding is preferred. Any irreversible compression coding method, such as the conventional irreversible compression coding method used in the MPEG-Audio, the Pulse Code Modulation (PCM) method at low bit rate, and the Adaptive Differential PCM (ADPCM), may be used for this purpose.

The bandwidth of voices, which is approximately from 200 Hz to approximately 4 kHz, varies according to the gender (male and female) and age of a vocalizing person. Thus, if the frequency band for recording voices is optionally limited according to the gender and age of the person, the coder 10 can make it possible to realize a higher compression rate.

Moreover, the utterance point of voice is single and therefore, it is preferred that the voice data are formed to reproduce a monophonic or monaural voice. In this case, to reproduce the piece of delivered music to be stereophonic at a receiver terminal (e.g., the music reproduction subsystem 2), 10 is preferred that proper utterance point data (i.e., the stereophonic position data and the depth data of the utterance point) is added to the voice data.

The separation or the voice data from the original music data by the voice data separator 12 may be realized by any method. For example, if a proper filter is used, the voice data can be separated from the original music data including the voice and performance data synthesized. Alternately, if a piece of music is recorded in a recording studio, the voice data may be generated by digitally recording separately from the performance data by way of a microphone.

The multiplexer 11 receives the compression-coded voice data from the coder 10 and the performance data from the separator 12 and then, multiplexes them together. Thus, a multiplexed digital music data of the piece of music to be delivered is outputted as the "digital delivering data". The multiplexed digital music data, i.e., the "delivering data", is then transmitted to the terminal of the specific receiver (i.e., the music reproduction subsystem 2) by way of the network 51.

To synchronize the timing of the voice data and the performance data with each other in the music reproduction subsystem 2, the multiplexer 11 in the music delivery subsystem 1 adds time stamp data to the voice data and the performance data during its multiplexing operation.

The performance data is a digital data that representing the musical performance procedure, which includes the scale and tempo or pace of musical performance, the strength and weakness and the tone of sound, the type of musical instruments used for musical performance, the stereophonic position of each musical instrument used, and so on. For example, the performance data can be generated by converting directly the information of a musical score for musical performance to a digital data or by manually converting the sound of performance through listening by a person. If the performance data is generated according to the MIDI (Musical Instrument Digital Interface) standard, it can be inputted directly into the multiplexer 11.

Figure 3:
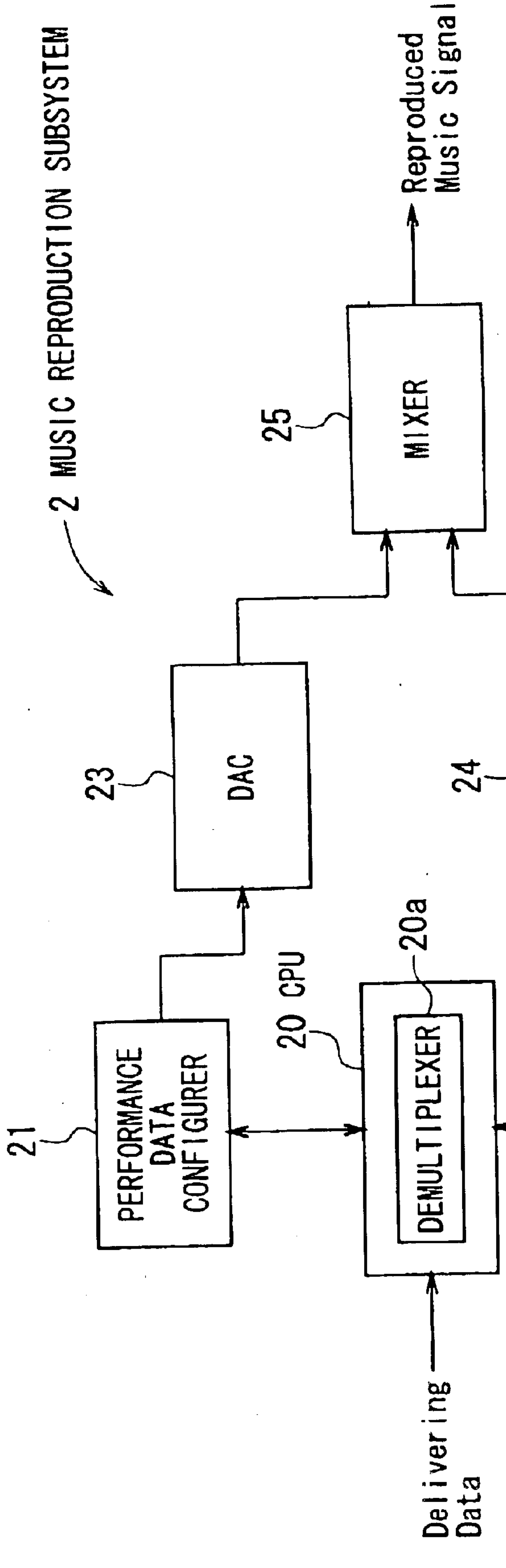
FIG. 3 is a functional block diagram showing the configuration of the music reproduction subsystem used in the music delivery system according to the first embodiment of FIG. 1.

On the other hand, the music reproduction subsystem 2 or the music deliver system 50 according to the first embodiment of FIG. 1 has the configuration as shown in FIG. 3. Specifically, the subsystem 2 comprises a Central Processing Unit CPU) 20, a performance data configurer 21, a voice data decoder 22, a digital-to-analog converter (DAC) 23 for the performance data, a digital-to-analog converter (DAC) 24 for the voice data, and a mixer (MIX) 25.

The CPU 20 includes a demultiplexer 20*a* in its inside, in other words, the CPU 20 has a function of demultiplexer. The demultiplexer 20*a* demultiplexes the digital delivering data transmitted from the multiplexer 11 of the music delivery subsystem 1, thereby separating the compressed-coded voice data from the performance data.

Moreover, the CPU 20 has a function of controlling the reproduction operations of the performance data configurer 21 and the voice data decoder 22, and a function of adjusting the pace or tempo of the musical performance configured by the configurer 21 by way of the time stamp data. The pace/tempo adjusting operation of the CPU 20 is realized by changing or amending the speed of the configured performance. This makes it possible to synchronize the performance with the voice.

The performance data configurer 21 receives the performance data separated from the voice data in the delivering data by the demultiplexer 20*a* in the CPU 20. Then, the configurer 21 configures the performance of the music thus delivered according to the performance data thus received, thereby outputting a digital performance configuration data.

Moreover, the configurer 21 is designed to add various types of sound effects, such as the stereophonic position of each musical instrument, reverberation effects thereof, and so on, to the performance thus configured. This operation of the configurer 21 is carried out according to the instructions from the CPU 20 and/or the performance data transmitted.

In summary, the performance data configurer 21 has approximately the same operations as those of a MIDI player device for reproducing music or sound according to the MIDI standard.

The voice data decoder 22 receives the compression-coded voice data separated from the performance data in the delivering data by the demultiplexer 20*a* in the CPU 20. Then, the decoder 22 decodes the compression-coded voice data thus separated, producing a PCM voice data.

In summary, the voice data decoder 22 has approximately the same operations as those of a MPEG-Audio decoder for decoding coded data according to the MPEG-Audio standard.

Moreover, the decoder 22 has a function of identifying the stereophonic position and the depth of the utterance point of voice, thereby reflecting the utterance point in the PCM voice data.

The DAC 23 converts the performance configuration data from the performance data configurer 21 to an analog performance signal. The analog performance signal thus generated is sent to the mixer 25.

The DAC 24 converts the PCM voice data from the voice data decoder 22 to an analog voice signal. The analog voice signal thus generated is sent to the mixer 25.

The mixer 25 mixes the analog performance signal from the DAC 23 and the analog voice signal from the DAC 24 together, thereby generating an analog reproduced music signal. If the reproduced music signal is inputted into a speaker, the sound of the delivered music is emitted, i.e., the delivered music is reproduced.

Next, the operation of the music reproduction subsystem 2 of the music delivery system 50 according to the first embodiment is explained below with reference to FIG. 4. This explanation is made while focusing on the operation of the CPU 20.

In the step A1, the demultiplexer 20*a* in the CPU 20 demultiplexes the delivering data delivered by the music delivery subsystem 1, thereby separating the compression-coded voice data from the performance data in the delivering data received. This step is carried out under the control of the CPU 20.

In the step A2, under the control of the CPU 20, the performance data thus separated is transmitted to the performance data configurer 21 and at the same time, the compression-coded voice data thus separated is transmitted to the voice data decoder 22.

At this stage, the performance data configurer 21 receives the performance data thus transmitted and then, configures the performance of the delivered music according to the performance data. Thus, the configurer 21 outputs the digital performance configuration data to the DAC 23. On the other hand, the voice decoder 22 receives the compression-coded voice data thus transmitted and then, decodes the compression-coded voice data of the delivered music. Thus, the decoder 22 outputs the PCM voice data to the DAC 24.

In the step A3, the CPU 20 compares the time stamp data of the PCM voice data and the time stamp data of the configured performance data. This means that the reproduction state of the PCM voice data and the reproduction state or the performance configuration data are compared with each other by way of their time stamp data.

In the step A4, if the reproduction state of the PCM voice data and that of the performance configuration data are not synchronized with each other, the flow is jumped to the step A5. In the step A5, the performing rate or pace of the configured performance data is adjusted for synchronization under the control of the CPU 20.

Specifically, if the reproduction state of the performance configuration data has some temporal delay with respect to that of the PCM voice data in the step A4, the performing rate or pace of the performance configuration data is increased in the step A5. Contrarily, if the reproduction state of the performance configuration data has some temporal prematurity with respect to that of the PCM voice data in the step A4, the performing rate or pace of the performance configuration data is decreased in the step A5.

The pace control of the musical performance may be realized by changing the value of the tempo or pace data contained in the performance data. For example, it may be realized by changing the value of the reference clock signal for musical performance in the configurer 21. The pace or tempo control of the performance is preferably carried out independent of the tempo or pace data contained in the performance data.

At this stage, the DAC 23 converts the digital performance configuration data from the performance data configurer 21 to the analog performance signal. Then, the DAC 23 transmits the analog performance signal thus generated to the mixer 25. On the other hand, the DAC 24 converts the PCM voice data from the voice data decoder 22 to the analog voice signal. Then, the DAC 24 transmits the analog voice signal to the mixer 25. Thereafter, the mixer 25 mixes the analog performance signal from the DAC 23 and the analog voice signal from the DAC 24 together, generating the analog reproduced music signal.

In the step A6, the CPU 20 judges whether or not the music delivery is continued. If the music delivery is continued, the flow is returned to the step A1 and conducts again the same process steps A1 to A6 as explained above. If the music delivery is not continued, the process flow is finished, i.e., the reproduction procedure in the music reproduction subsystem 2 is completed.

With the music delivery system 50 according to the first embodiment, as seen from the above explanation, the digital voice data and the digital performance data of the original music data are separated by the voice data separator 12 in the music delivery subsystem 1 and then, only the digital voice data is compression-coded by the compression coder 10 therein. Thereafter, the compression-coded voice data and the performance data are multiplexed by the multiplexer 11, thereby generating the digital delivering data. The delivering data thus generated is then transmitted by way of the network 51 to the music reproduction subsystem 7 provided in the specific receiver terminal.

Therefore, the amount of the compression-coded voice data is reduced due to its narrowness of the communication bandwidth and at the same time, the amount of the compression-coded voice data will be null or zero in the introduction and episode parts of the original music. As a result, the data amount of music to be delivered is further reduced compared with the above-identified prior-art methods and systems. This means that the irreversible data compression rate is enhanced.

Furthermore, the musical performance (i.e., accompaniment) of the original music is reproduced according to the performance data transmitted through the network 3 in the music reproduction subsystem 2. Data compression is unnecessary for the performance data. As a result, the sound quality degradation of the reproduced music is prevented or effectively suppressed.

Second Embodiment

Figure 5:
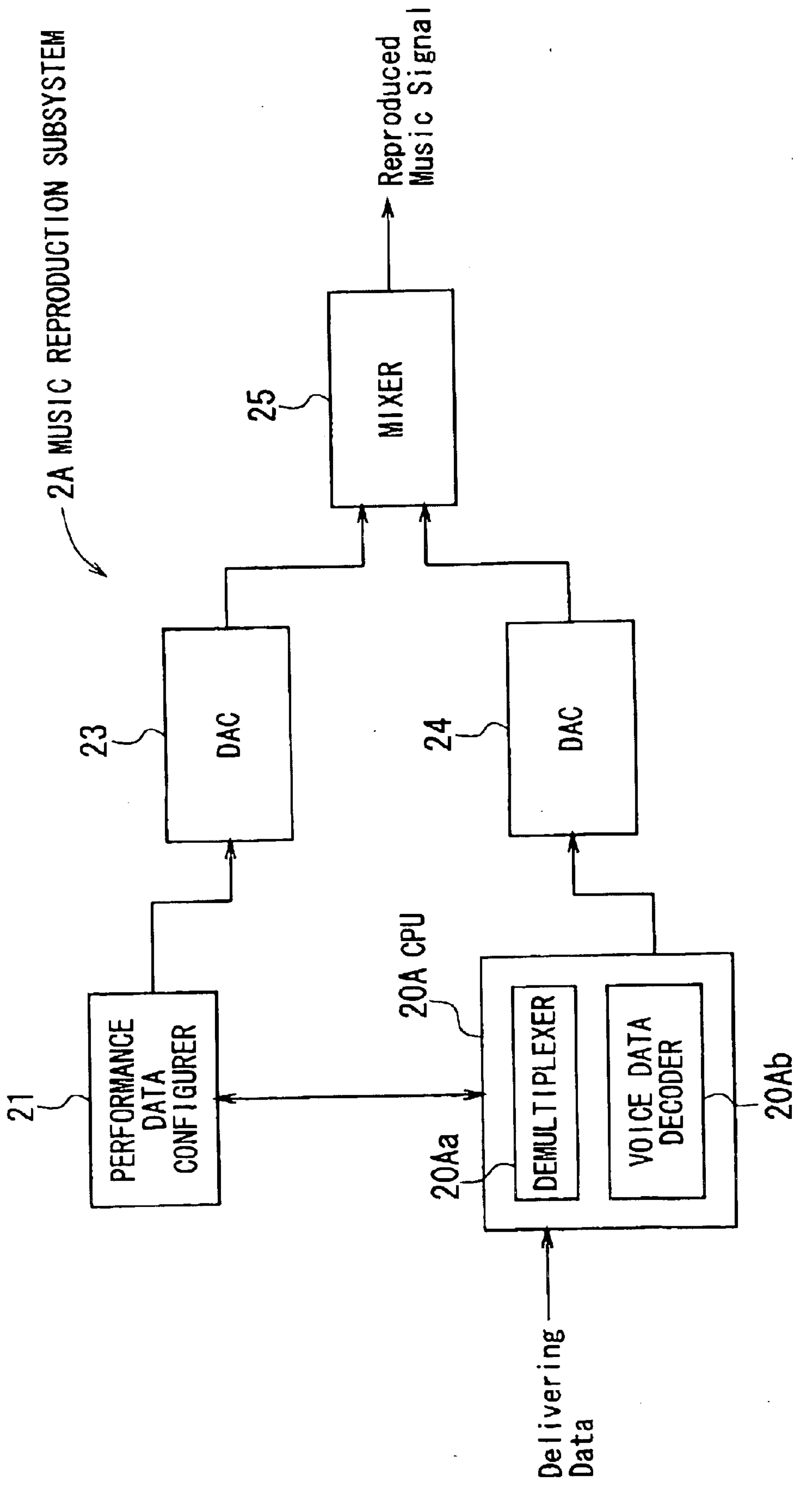
FIG. 5 is a functional block diagram showing the configuration of a music reproduction subsystem used in a music delivery system according to a second embodiment of the invention.
Figure 6:
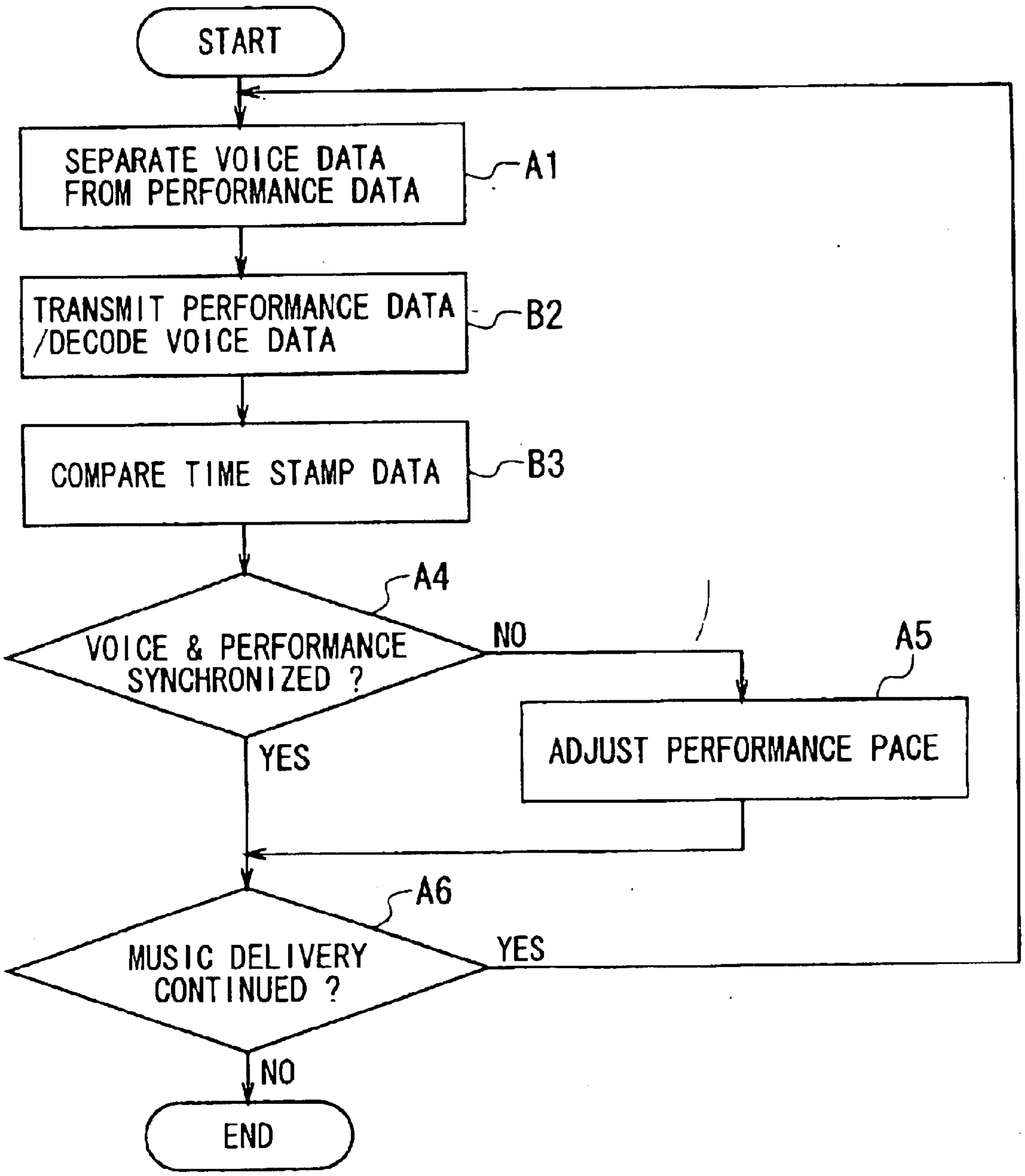
FIG. 6 is a flowchart showing the operation of the music reproduction subsystem of FIG. 5 used in the music delivery system according to the second embodiment.

FIGS. 5 and 6 show the configuration and operation of a music reproduction subsystem 2A used in a music delivery system 50 according to a second embodiment of the invention, respectively.

As seen from FIG. 5, the music reproduction subsystem 2A of the second embodiment has a configuration obtained by deleting the voice data decoder 22 from the music reproduction subsystem 2 of FIG. 3 in the first embodiment.

In this second embodiment, unlike the first embodiment, a CPU 20A comprises not only a demultiplexer 20A*a* but also a voice data decoder 20A*b*. Therefore, the function of the voice data decoder 22 is carried out by the function of the voice data decoder 20A*b* in the CPU 20A. In other words, the function of the decoder 22 is provided or created by the operation of the CPU 20A.

Since the function of the decoder 22 is created by the CPU 20A, the necessary performance of the CPU 20A is higher than the CPU 20 in the first embodiment; in other words, a higher-performance CPU than the first embodiment needs to be used as the CPU 20A. However, this requirement is easily met by a popular, versatile CPU, which is inexpensive. On the other hand, the dedicated voice data decoder 22 is unnecessary. As a result, there is an additional advantage that the fabrication cost of the music reproduction subsystem 2A is reduced with respect to the subsystem 2 of the first embodiment.

Figure 4:
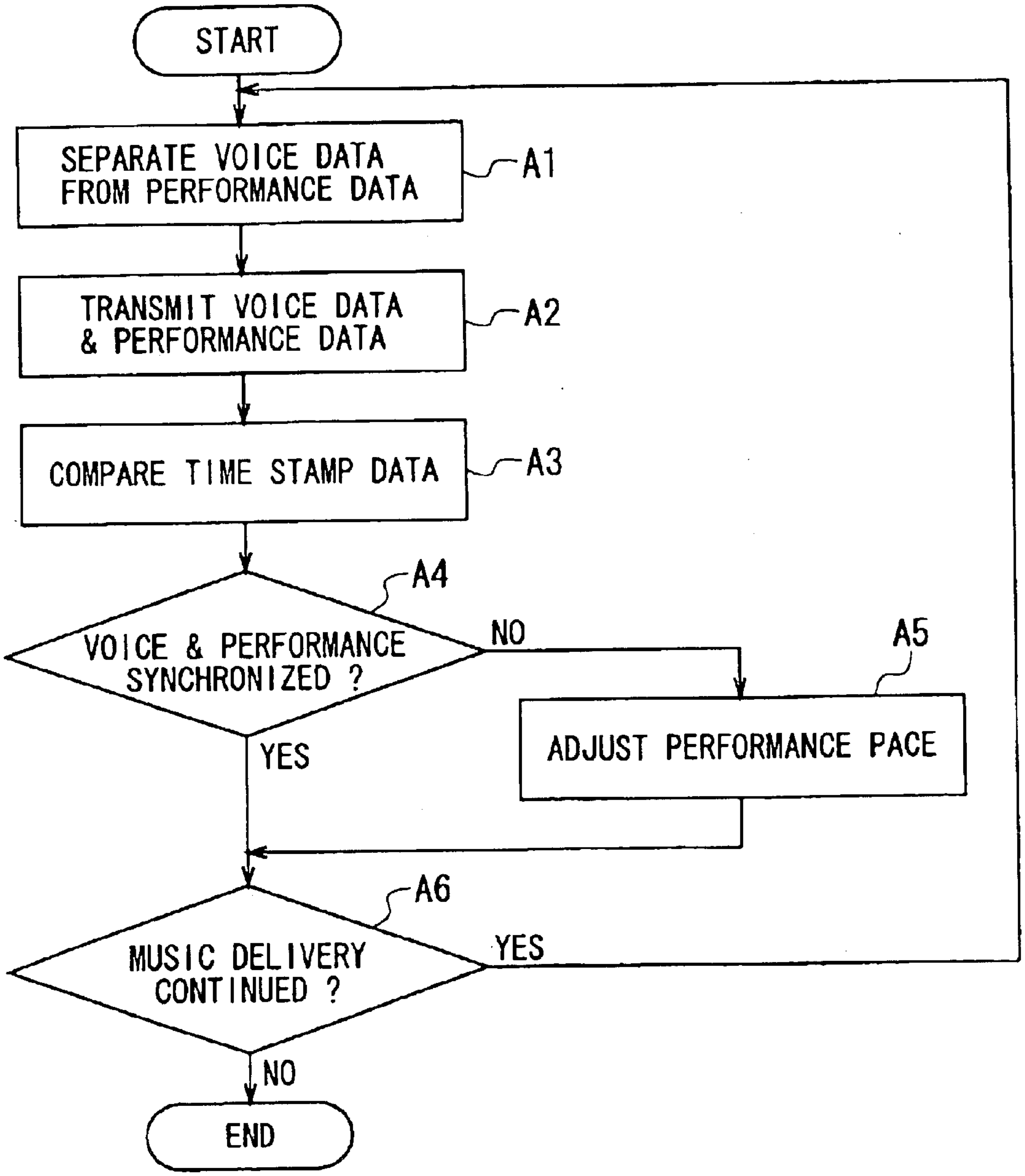
FIG. 4 is a flowchart showing the operation of the music reproduction subsystem of FIG. 3 used in the music delivery system according to the first embodiment of FIG. 1.

The operation flow of the music reproduction subsystem 2A of the second embodiment is different from that of the first embodiment of FIG. 4 in only the step B2 and B3. In the step B2, the CPU 20A transmits the performance data to the performance data configurer 21 while the CPU 20A decodes the compression coded voice data. In the step B3, the CPU 20A compares the time stamp data of the PCM voice data decoded by the voice data decoder 20A*b* of the CPU 20A and the time stamp data of the performance configuration data generated by the configurer 21.

With the music delivery system 50 using the reproduction subsystem 2A according to the second embodiment, as seen from the above explanation, there are the same advantages as those in the first embodiment.

Third Embodiment

Figure 7:
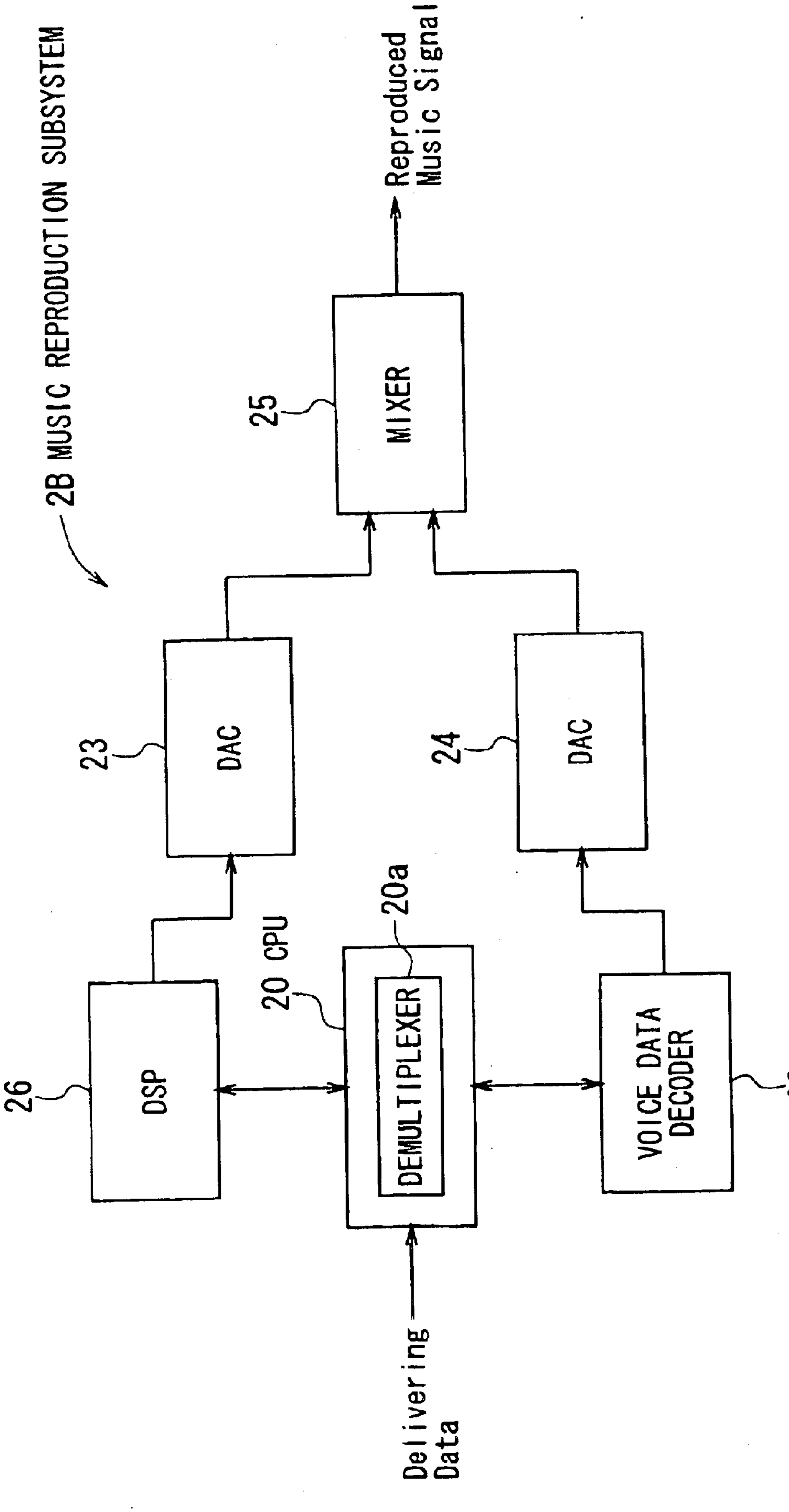
FIG. 7 is a functional block diagram showing the configuration of a music reproduction subsystem used in a music delivery system according to a third embodiment of the invention.
Figure 8:
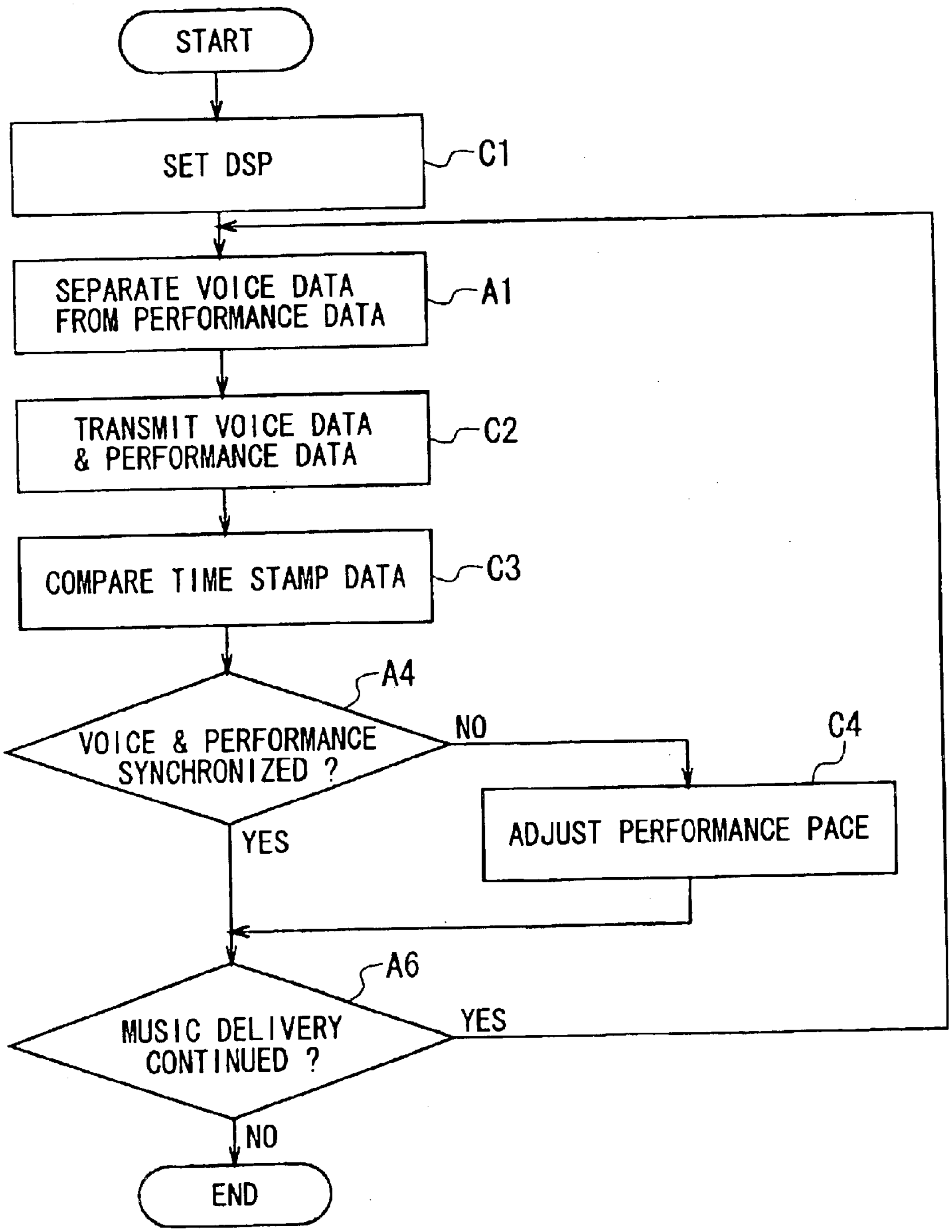
FIG. 8 is a flowchart showing the operation of the music reproduction subsystem of FIG. 7 used in the music delivery system according to the third embodiment.

FIGS. 7 and 8 show the configuration and operation of a music reproduction subsystem 2B used in a music delivery system 50 according to a third embodiment of the invention, respectively.

As seen from FIG. 7, the music reproduction subsystem 2B of the third embodiment has a configuration obtained by replacing the performance data configurer 21 with a Digital Signal Processor (DSP) 26 in the first embodiment of FIG. 3.

In this third embodiment, the use of the DSP 26 does not reduce the cost of the subsystem 2B, However, if the music delivery subsystem 1 of FIGS. 2A and 2B is capable of sending a DSP code that creates the tone of a musical instrument in the music reproduction subsystem 2B, there is an additional advantage that the performance of music reproduced in the subsystem 2B can include the tone of a musical instrument or instruments. Moreover, there is another additional advantage that the DSP 26 can be applied to other processes than the operation of the performance data configurer 21 if the subsystem 2B does not conduct its reproduction operation of music.

The operation flow of the music reproduction subsystem 2B of the third embodiment is different from that of the first embodiment of FIG. 4 in only the steps C1, C2, C3 and C4.

In the step C1, prior to the reception of the delivering data, the DSP 26 makes its setting operation to provide a function of the performance data configurer 21.

In the step C2, under the control of the CPU 20, the performance data is transmitted to the DSP 26 from the CPU 20 while the voice data is transmitted to the voice data decoder 22 fromthe CPU 20.

In the step C3, the CPU 20 compares the time stamp data of the PCM voice data decoded by the voice data decoder 22 and the time stamp data of the performance configuration data generated by the DSP 26.

In the step C4, if the reproduction state of the performance configuration data by the DSP 26 has some temporal delay with respect to that of the PCM voice data by the decoder 22 in the step A4, the performing rate or pace of the performance configuration data is increased. Contrarily, if the reproduction state of the performance configuration data has some temporal prematurity with respect to that of the PCM voice data in the step A4, the performing rate or pace of the performance configuration data is decreased in the step C4.

With the music delivery system 50 using the reproduction subsystem 2B according to the third embodiment, it is obvious that there are the same advantages as those in the first embodiment.

Fourth Embodiment

Figure 9:
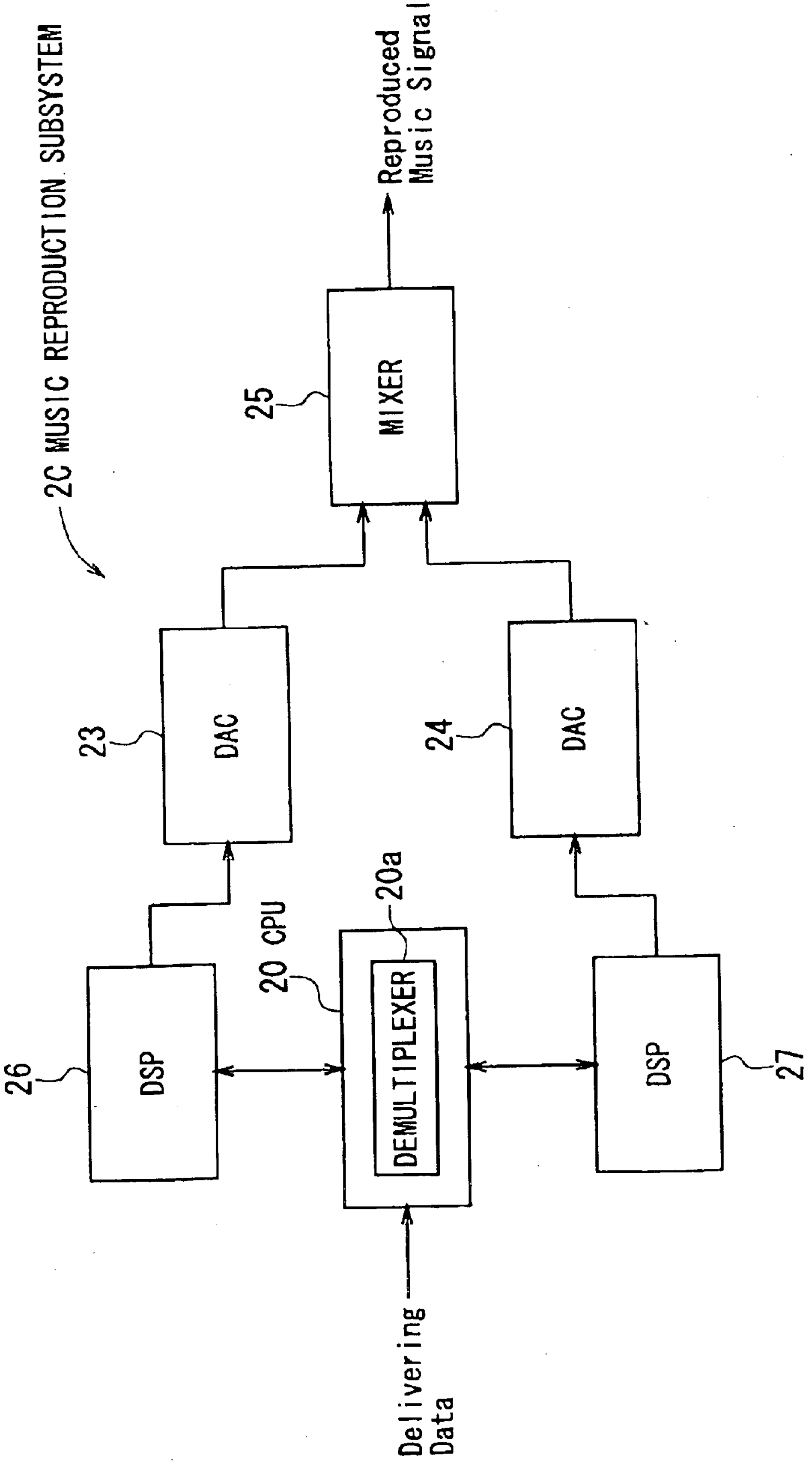
FIG. 9 is a functional block diagram showing the configuration of a music reproduction subsystem used in a music delivery system according to a fourth embodiment of the invention.
Figure 10:
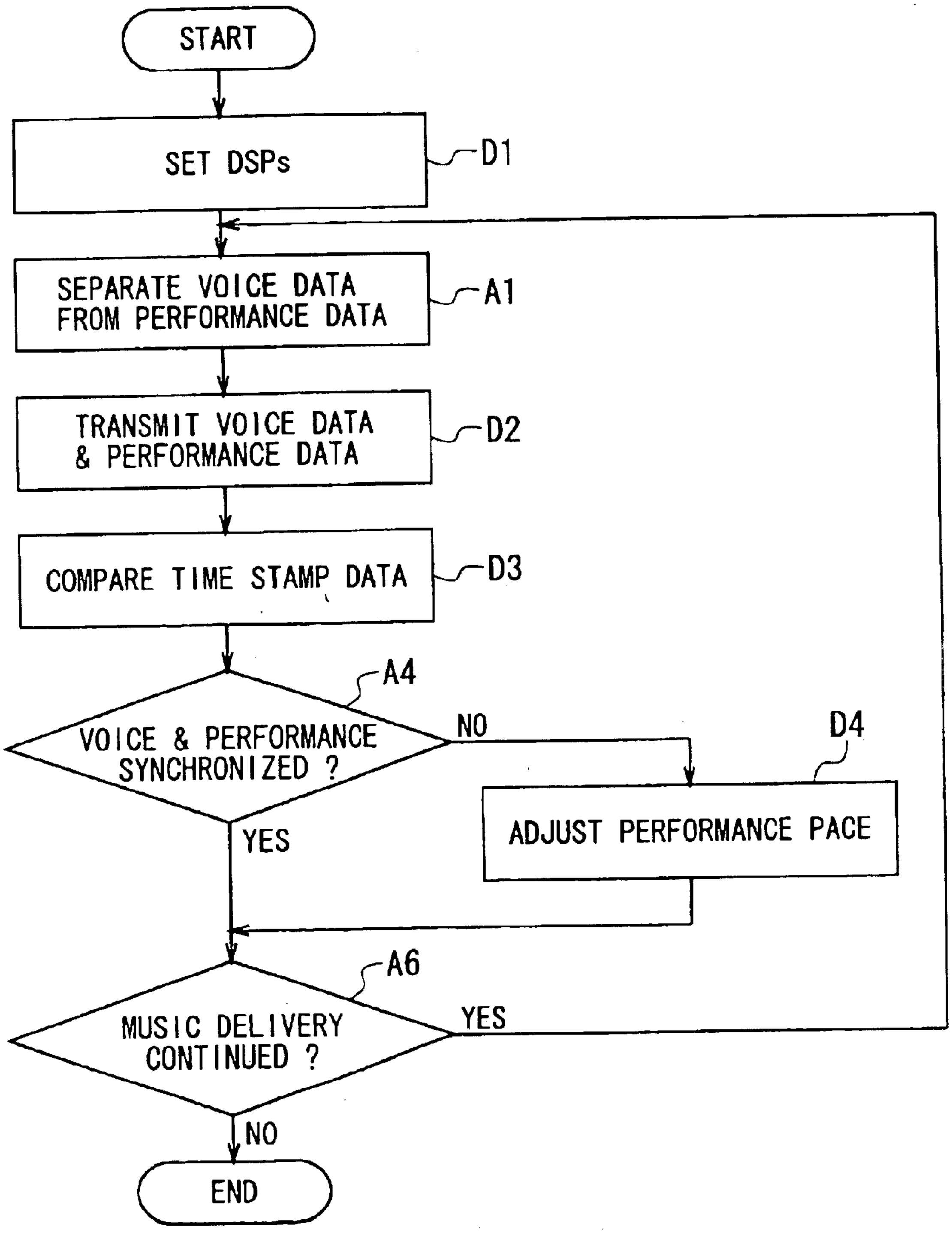
FIG. 10 is a flowchart showing the operation of the music reproduction subsystem of FIG. 9 used in the music delivery system according to the fourth embodiment.

FIGS. 9 and 10 show the configuration and operation of a music reproduction subsystem 2C used in a music delivery system 50 according to a fourth embodiment of the invention, respectively.

As seen from FIG. 9, the music reproduction subsystem 2C of the fourth embodiment has a configuration obtained by replacing respectively the performance data configurer 21 and the voice data decoder 22 with DSPs 26 and 27 in the first embodiment of FIG. 3.

In the fourth embodiment, there is the same additional advantage as those in the third embodiment, because the DSP 26 is used like the third embodiment.

The operation flow of the music reproduction subsystem 2C of the fourth embodiment is different from that of the first embodiment of FIG. 4 in only the steps D1, D2, D3 and D4.

In the step D1, prior to the reception of the delivering data, the DSPs 26 and 27 make their setting operations to provide a function of the performance data configurer 21 and a function of the voice data decoder 22, respectively.

In the step D2, the performance data is transmitted to the DSP 26 from the CPU 20 while the voice data is transmitted to the DSP 27 from the CPU 20.

In the step D3, the CPU 20 compares the time stamp data of the PCM voice data decoded by the DSP 27 and the time stamp data of the performance configuration data generated by the DSP 26.

In the step D4, if the reproduction state of the performance configuration data by the DSP 26 has some temporal delay with respect to that of the PCM voice data by the DSP 27 in the step A4, the performing rate or pace of the performance configuration data is increased. Contrarily, if the reproduction state of the performance configuration data has some temporal prematurity with respect to that of the PCM voice data in the step A4, the performing rate or pace of the performance configuration data is decreased in the step D4.

With the music delivery system 50 using the reproduction subsystem 2C according to the fourth embodiment, it is obvious that there are the same advantages as those in the first embodiment.

Fifth Embodiment

Figure 11:
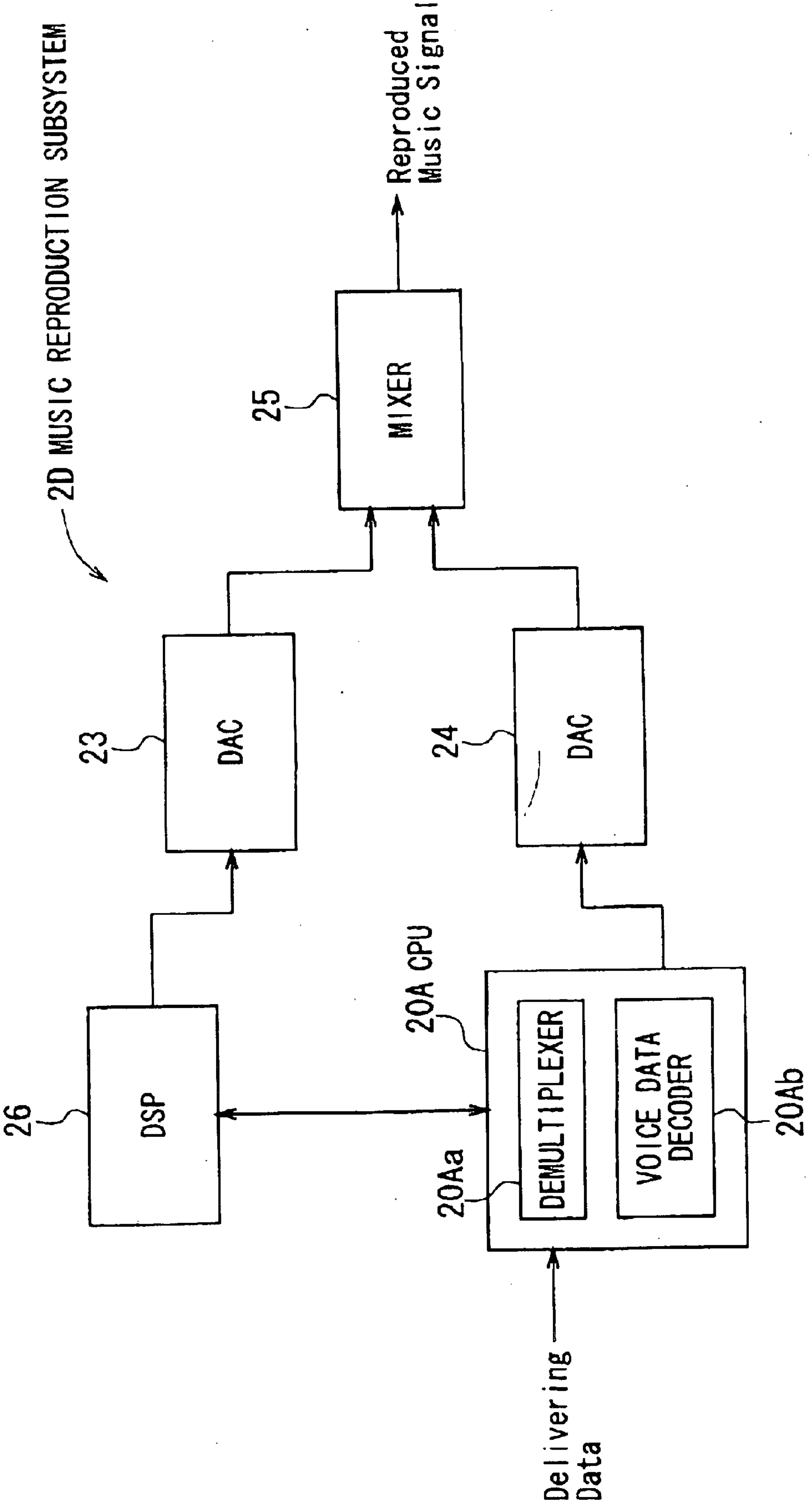
FIG. 11 is a functional block diagram showing the configuration of a music reproduction subsystem used in a music delivery system according to a fifth embodiment of the invention.
Figure 12:
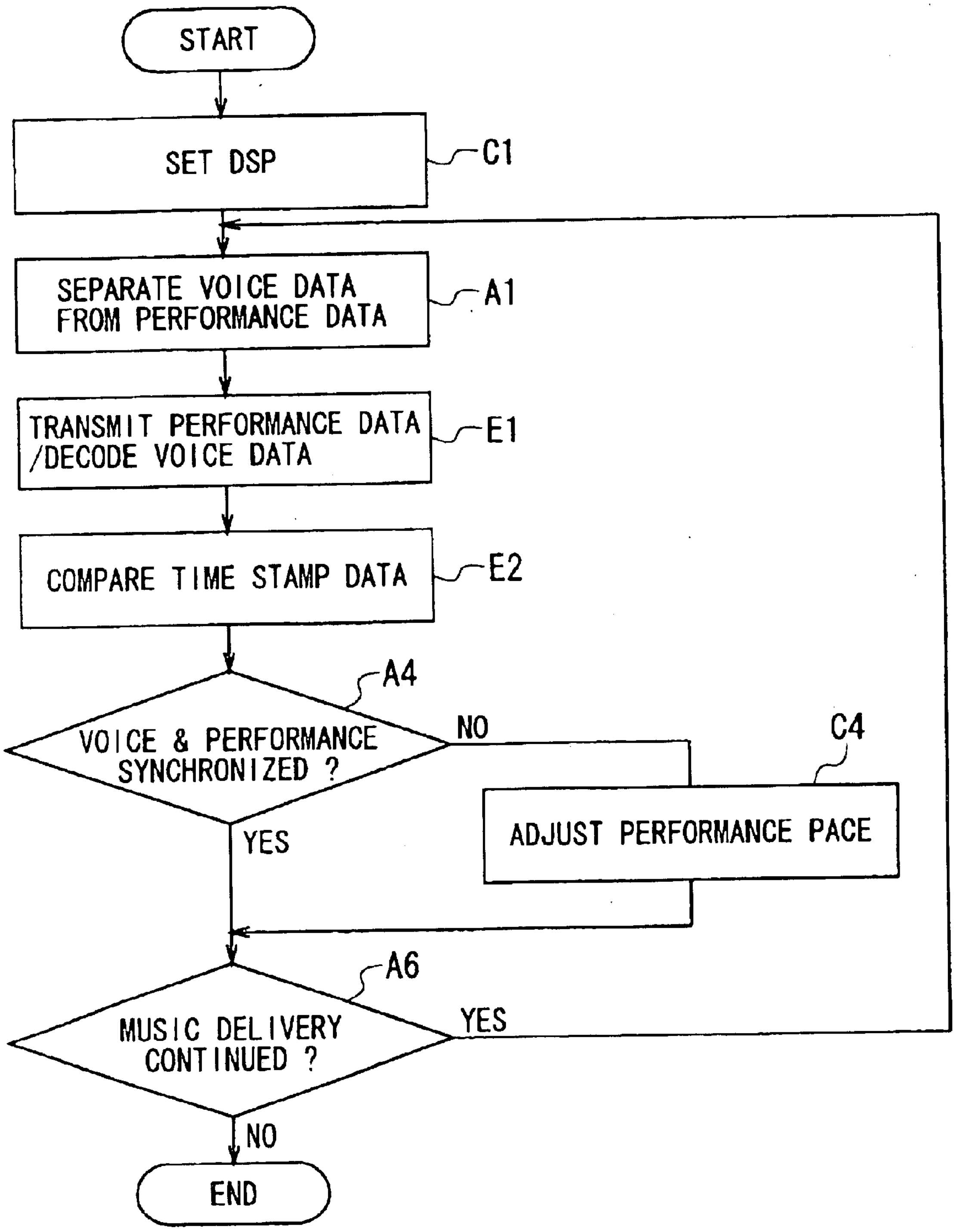
FIG. 12 is a flowchart showing the operation of the music reproduction subsystem of FIG. 11 used in the music delivery system according to the fifth embodiment.

FIGS. 11 and 12 show the configuration and operation of a music reproduction subsystem 2D used in a music delivery system 50 according to a fifth embodiment of the invention, respectively.

As seen from FIG. 11, the music reproduction subsystem 2D of the fifth embodiment has a configuration obtained by deleting the voice data decoder 22 and replacing the performance data configurer 21 with a DSP 26 in the first embodiment. Also, the CPU 20 in the first embodiment is replaced with a CPU 20A having a demultiplexer 20A*a* and a voice data decoder 20A*b*.

It may be said that the subsystem 20 has a configuration obtained by replacing the performance data configurer 21 with a DSP 26 in the second embodiment of FIG. 5 or by deleting the voice data decoder 22 in the third embodiment of FIG. 7.

The operation flow of the music reproduction subsystem 2D of the fifth embodiment is different from that of the third embodiment of FIG. 8 in only the steps E1 and E2.

In the step E1, the performance data is transmitted to the DSP 26 from the CPU 20 while the voice data is decoded by the voice data decoder 20A*b* in the CPU 20A.

In the step E2, the CPU 20A compares the time stamp data of the PCM voice data decoded by the decoder 20A*b* and the time stamp data of the performance configuration data generated by the DSP 26.

With the music delivery system 50 using the reproduction subsystem 2D according to the fifth embodiment, it is obvious that there are the same advantages as those in the first embodiment.

Variations

Needless to say, the invention is not limited to the above-described first to fifth embodiments. Any change or modification may be added to these embodiments within the spirit of the invention.

For example, in the above-described embodiments, the number and configuration or each device or subsystem may be changed according to the necessity.

While the preferred forms of the present invention has been described, it is to be understood that modifications will be apparent to those skilled in the art without departing from the spirit of the invention. The scope of the present invention, therefore, is to be determined solely by the following claims.

What is claimed is:

1. A system for delivering music, comprising:

(a) a music delivery subsystem for generating a delivering data from an original music data including a voice data and a performance data;

the music delivery subsystem comprising a compression coder and a multiplexer;

the compression coder compression-coding the voice data of the original music data, thereby generating a compression-coded voice data;

the multiplexer multiplexing the compression-coded voice data from the compression coder and the performance data of the original music data, thereby generating a delivering data;

(b) a network for allowing the delivering data to be transmitted; and (c) at least one music reproduction subsystem for reproducing an original music corresponding to the original music data from the delivering data transmitted through the network;

the at least one music reproduction subsystem comprising a demultiplexer, a performance data configurer, a voice data decoder, and a mixer;

the demultiplexer demutiplexing the delivering data to the compression-coded voice data and the performance data;

the performance data configurer configuring a musical performance from the performance data, thereby forming a performance configuration;

the voice data decoder decoding the compression-coded voice data to generate a voice data;

the mixer mixing the performance configuration from the performance data configurer and the voice data from the voice data decoder, thereby generating a mixed data corresponding to the original music wherein the multiplexer of the music delivery subsystem adds time stamp data to the voice data and the performance data;

and wherein the music reproduction subsystem comprises a synchronizer for synchronizing the voice of the original music and the musical performance thereof with each other through comparison between the time stamp data of the voice data and that of the performance data.

2. The system according to claim 1, wherein the compression coder of the music delivery subsystem is designed not to generate the voice data while the original music includes no voice.

3. The system according to claim 1, wherein the voice data is generated to form a monophonic or monaural voice and includes an utterance point data;

and wherein the voice data decoder of the music reproduction subsystem decodes the compression-coded voice data to generate the voice data using the utterance point data.

4. A music delivery subsystem comprising:

(a) a compression coder for compression-coding a voice data of an original music data to thereby generate a compression-coded voice data; and (b) a multiplexer for multiplexing the compression-coded voice data from the compression coder and a performance data of the original music data, thereby generating a delivering data wherein the multiplexer adds time stamp data to the voice data and the performance data;

and wherein the time stamp data of the voice data and that of the performance data are used for synchronization between the voice data and the performance data.

5. The subsystem according to claim 4, wherein the compression coder is designed not to generate the voice data while the original music includes no voice.

6. The subsystem according to claim 4, wherein the voice data is generated to form a monophonic or monaural voice and includes an utterance point data.

7. A music reproduction subsystem for reproducing an original music from a delivering data including a compression-coded voice data and a performance data multiplexed together, the subsystem comprising:

(a) a demultiplexer for demultiplexing the delivering data to the compression-coded voice data and the performance data;

(b) a performance data configurer for configuring a musical performance from the performance data, thereby forming a performance configuration;

(c) a voice data decoder for decoding the compression-coded voice data to generate a voice data; and (d) a mixer for mixing the performance configuration from the performance data configurer and the voice data from the voice data decoder, thereby generating a mixed data corresponding to the original music further comprising a synchronizer for synchronization between the voice data and the performance configuration through comparison between a time stamp data of the voice data and a time stamp data of the performance data.

8. The subsystem according to claim 7, wherein the voice data is generated to form a monophonic or monaural voice and includes an utterance point data.

9. A method for delivering music, comprising the steps of:

(a) compression-coding a voice data of an original music data, thereby generating a compression-coded voice data;

(b) multiplexing the compression-coded voice data from the compression coder and a performance data of the original music data, thereby generating a delivering data;

(c) delivering the delivering data to at least one music reproduction subsystem by way of a network;

(d) demultiplexing the delivering data to the compression-coded voice data and the performance data in the at least one music reproduction subsystem;

(e) configuring a musical performance from the performance data, thereby forming a performance configuration data in the at least one music reproduction subsystem;

(f) decoding the compression-coded voice data to generate a voice data in the at least one music reproduction subsystem;

(g) mixing the performance configuration data formed in the step (e) and the voice data generated in the step (f), thereby generating a mixed data corresponding to the original music data in the at least one music reproduction subsystem wherein time stamp data are added to the voice data and the performance data;

and wherein the voice of the original music and the musical performance thereof are synchronized with each other through comparison between the time stamp data of the voice data and that of the performance data.

10. The method according to claim 9, wherein the voice data is not generated while the original music includes no voice.

11. The method according to claim 9, wherein the voice data is generated to form a monophonic or monaural voice and includes an utterance point data;

and wherein the compression-coded voice data is decoded to generate the voice data using the utterance point data in the step (f).

* * * * *